United States Patent
Li

(10) Patent No.: US 10,318,717 B2
(45) Date of Patent: Jun. 11, 2019

(54) MESSAGE DISPLAY METHOD AND APPARATUS

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 62 days.

(21) Appl. No.: 15/109,933

(22) PCT Filed: Jan. 8, 2016

(86) PCT No.: PCT/CN2016/070458
§ 371 (c)(1),
(2) Date: Jul. 6, 2016

(87) PCT Pub. No.: WO2017/012302
PCT Pub. Date: Jan. 26, 2017

(65) Prior Publication Data
US 2017/0147802 A1    May 25, 2017

(30) Foreign Application Priority Data
Jul. 23, 2015  (CN) .......................... 2015 1 0437362

(51) Int. Cl.
*G06F 21/10* (2013.01)
*G06F 21/32* (2013.01)
(Continued)

(52) U.S. Cl.
CPC .............. *G06F 21/32* (2013.01); *G06F 21/10* (2013.01); *G06F 21/606* (2013.01); *G06F 21/84* (2013.01);
(Continued)

(58) Field of Classification Search
CPC ......... H04L 51/26; H04L 51/34; H04L 51/12; G06F 21/606; G06F 21/10; G06F 21/32; G06F 21/84; G06F 2221/2147
(Continued)

(56) References Cited

U.S. PATENT DOCUMENTS

2013/0074195 A1* 3/2013 Johnston ............... H04L 51/34
726/28
2013/0150019 A1* 6/2013 Lee ........................ G09G 5/003
455/419
(Continued)

FOREIGN PATENT DOCUMENTS

| CN | 101252748 A | 8/2008 |
|---|---|---|
| CN | 101674372 A | 3/2010 |

(Continued)

OTHER PUBLICATIONS

International Search Report and Written Opinion dated Apr. 25, 2016; PCT/CN2016/070458.
(Continued)

*Primary Examiner* — William S Powers
*Assistant Examiner* — Aubrey H Wyszynski
(74) *Attorney, Agent, or Firm* — Ladas & Parry LLP

(57) ABSTRACT

The present disclosure discloses a message display method and apparatus. The method comprises: receiving unlock information and authenticating the unlock information; and selecting one message from at least one received messages and displaying content of a selected message if it is determined that authentication of the unlock information is passed. That is, in the technical solution as described in the embodiments of the present disclosure, if it is determined that authentication of the unlock information is passed, then one message would be selected directly and its content is displayed, so that flows of displaying the message are
(Continued)

simplified and steps of manual operation are reduced, which enables that the message display method as described in the embodiment of the present disclosure become more user-friendly and user experience would be better.

10 Claims, 2 Drawing Sheets

(51) Int. Cl.
    *G06F 21/60*     (2013.01)
    *G06F 21/84*     (2013.01)
    *H04L 12/58*     (2006.01)

(52) U.S. Cl.
    CPC .............. *H04L 51/12* (2013.01); *H04L 51/26* (2013.01); *H04L 51/34* (2013.01); *G06F 2221/2147* (2013.01)

(58) Field of Classification Search
    USPC .......................................................... 726/19
    See application file for complete search history.

(56) References Cited

U.S. PATENT DOCUMENTS

2014/0010417 A1\*   1/2014   Hwang .............. G06K 9/00288
                                                     382/118
2016/0192324 A1     6/2016   Zhang et al.

FOREIGN PATENT DOCUMENTS

| CN | 101727354 A | 6/2010 |
|----|-------------|--------|
| CN | 104238883 A | 12/2014 |
| CN | 104615920 A | 5/2015 |
| CN | 104992102 A | 10/2015 |
| WO | 2015/074604 A1 | 5/2015 |

OTHER PUBLICATIONS

The First Chinese Office Action dated Jun. 26, 2017; Appln. No. 201510437362.1.
The Second Chinese Office Action dated Sep. 1, 2017; Appln. 201510437362.1.
The Fourth Chinese Office Action dated Jun. 19, 2018; Appln. No. 201510437362.1.
The Third Chinese Office Action dated Feb. 6, 2018; Appln. No. 201510437362.1.

\* cited by examiner

MESSAGE DISPLAY METHOD AND APPARATUS

TECHNICAL FIELD

The present disclosure relates to a display technique field, in particular to a message display method and apparatus.

BACKGROUND

As a terminal develops constantly, a growing number of application programs can be installed on the terminal, such that messages including messages pushed out by application programs and received by the terminal also become more and more. In this case, how to display various messages received by the terminal to a corresponding terminal user in time becomes a technical problem urgently to be solved.

In particular, at present, the terminal can display various messages received by the terminal to the corresponding terminal user in the following manner: receiving an unlock instruction for a lock screen interface that is given by the terminal user; entering into the home page of the terminal and displaying total number of messages corresponding to respective applications when it is determined that authentication of the unlock instruction is passed; after that, if a message display instruction (such as a click instruction) given by the terminal user for a certain application is received, then a message list corresponding to the application is displayed, and further content of this message is displayed in a corresponding display interface according to the message display instruction (such as a click instruction) given by the terminal user for a certain message in the message list, in order that the terminal user browses the corresponding content of the message.

It can be known from the above content that, in the existing message display process, after determining that the lock screen interface is unlocked, the terminal is capable of displaying specific content of the message only after having received the message display instruction given by the terminal user according to the total number of messages and/or message list corresponding to respective applications, such that flows of displaying messages become complicated and have low efficiency, thereby reducing user experience.

SUMMARY

There are provided in embodiments of the present disclosure a message display method and apparatus, which are used to solve the problem that the existing flows of displaying messages are complicated and have low efficiency.

There is provided in an embodiment of the present disclosure a message display method, comprising:

receiving unlock information and authenticating the unlock information; and selecting one message from at least one received messages and displaying content of a selected message if it is determined that authentication of the unlock information is passed.

Optionally, the unlock information comprises at least one or more of following information:

fingerprint unlock information, key unlock information, slide unlock information, gesture unlock information, voice unlock information or human face recognition unlock information.

Further, when at least two messages are received, the selecting one message and displaying content of a selected message comprises:

selecting one message received at the earliest time or one message having a highest priority from all of received messages, and displaying content of a selected message.

Further, after the content of the selected message is displayed, the method further comprises:

turning off a message displayed currently if a message turn-off instruction is received or a set display period is reached;

Optionally, the message turn-off instruction comprises at least one or more of following instructions:

gesture instruction, voice instruction, slide instruction or key instruction.

Further, after the content of the selected message is displayed, the method further comprises:

marking the selected message as a read state.

Further, after the message displayed currently is turned off, the method further comprises:

determining whether there are messages not read currently; and selecting one message from the messages not read and displaying content of a selected message if there are messages not read currently.

Further, before authentication of the unlock information is passed, the method further comprises:

displaying only non-private information of a received message on a lock screen interface if it is determined that the received message is a preset private message.

Further, there is further provided in an embodiment of the present disclosure a message display apparatus, comprising:

a receiving unit, configured to receive unlock information and authenticate the unlock information; and a processing unit, configured to select one message from at least one received messages and display content of a selected message if it is determined that authentication of the unlock information is passed.

Optionally, the unlock information comprises at least one or more of following information:

fingerprint unlock information, key unlock information, slide unlock information, gesture unlock information, voice unlock information or human face recognition unlock information.

Further, the processing unit is further configured to select one message received at the earliest time or one message having a highest priority from all of received messages and display content of a selected message when at least two messages are received.

Further, the receiving unit is further configured to turn off a message displayed currently if a message turn-off instruction is received or a set display period is reached after the processing unit displays content of a selected message Optionally, the message turn-off instruction comprises at least one or more of following instructions:

gesture instruction, voice instruction, slide instruction or key instruction.

Further, the processing unit is further configured to mark the selected message as a read state after the content of the selected message is displayed.

Further, the processing unit is further configured to determine whether there are messages not read currently after the message displayed currently is turned off, and select one message from the messages not read and display content of a selected message if there are messages not read currently.

Further, the apparatus further comprises a display unit:

the display unit is configured to display only non-private information of a received message on a lock screen interface if it is determined that the received message is a preset private message before authentication of the unlock information is passed.

The embodiments of the present disclosure have following beneficial effects:

The message display method and apparatus provided in the embodiments of the present disclosure receives the unlock information and authenticates the unlock information, and selects one message from at least one received messages and displays content of a selected message if authentication of the unlock information is passed. That is, in the technical solution of the embodiments of the present disclosure, if it is determined that authentication of the unlock information is passed, then one message would be selected directly and its content is displayed, so that flows of displaying the message are simplified and steps of manual operation are reduced, which enables that the message display method as described in the embodiment of the present disclosure becomes more user-friendly and user experience would be better.

BRIEF DESCRIPTION OF THE DRAWINGS

In order to describe technical solutions in embodiments of the present disclosure more clearly, figures needed to be used in description of the embodiments will be introduced below briefly. Obviously, the figures described below are just some embodiments of the present disclosure. For those ordinary skilled in the art, other figures can also be obtained according to these figures without paying any inventive labor.

DETAILED DESCRIPTION

In order to make purposes, technical solutions and advantages of the present disclosure more clear, the present disclosure will be further described in detail by combing with the figures. Obviously, embodiments described below are just a part of embodiments of the present disclosure, but not all of embodiments. All of other embodiments obtained by those ordinary skilled in the art based on the embodiments of the present disclosure without paying any inventive labor belong to the scope sought for protection in the present disclosure.

First Embodiment

Figure 1:
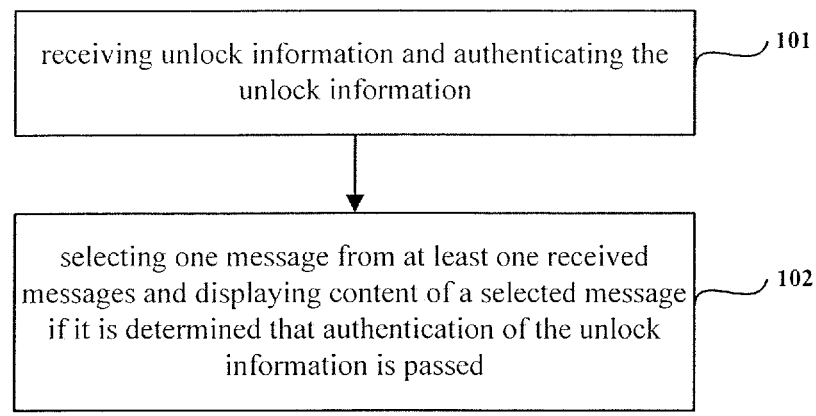
FIG. 1 shows a flow schematic diagram of a message display method as described in a first embodiment of the present disclosure.

There is provided in the first embodiment a message display method. As shown in FIG. 1, it is a flow schematic diagram of the message display method as described in the first embodiment of the present disclosure. The method can comprise following steps:

Step 101: receiving unlock information and authenticating the unlock information.

Herein, the unlock information can comprise at least one or more of following information: fingerprint unlock information, key unlock information, slide unlock information (i.e., touch unlock information), gesture unlock information, voice unlock information or human face recognition unlock information or the like. Of course, it may also comprise other unlock information used for unlocking a lock screen interface, to which the embodiment of the present disclosure does not limit.

Optionally, the authenticating the unlock information can be implemented as: determining whether received unlock information matches with authorized unlock information that is stored locally in advance; if the received unlock information matches with the authorized unlock information, then it is considered that authentication of the unlock information is passed; otherwise, a user is refused to access.

Step 102: selecting one message from at least one received messages and displaying content of a selected message if it is determined that authentication of the unlock information is passed.

Optionally, the message can comprise short message notifications or messages pushed out by various applications, to which the embodiment of the present disclosure does not limit.

That is, in the technical solution as described in the embodiment of the present disclosure, one message would be selected directly and its content is displayed if it is determined that authentication of the unlock information is passed, so that flows of displaying the message are simplified and steps of manual operations are reduced, which enables that the message display method as described in the embodiment of the present disclosure become more user-friendly and user experience would be better.

Optionally, for step 102, if it is determined that authentication of the unlock information is passed and it is determined that no message is received, then the user would be allowed to perform corresponding operations on the device in a normal manner, to which no further description is given in the embodiment of the present disclosure.

Further, for step 102, when only one message is received, the selecting one message and displaying content of a selected message can be implemented as: selecting one message received currently and displaying its content; when at least two messages are received, the selecting one message and displaying content of a selected message can be implemented as: selecting one message received at the earliest time or one message having a highest priority from all of received messages, and displaying content of a selected message.

For example, by taking the selecting one message received at the earliest from all of the received messages as an example, assuming that three messages are displayed on the lock screen interface, and a receiving time of a first message is 08:10, a receiving time of a second message is 08:12, and a receiving time of a third message is 08:15, then the message whose receiving time is 08:10 can be selected from the three messages displayed on the lock screen interface and its content is displayed.

For example, when a message is received, the receiving time of each message can be saved, in order that one message whose receiving time is the earliest can be selected according to the saved receiving time of various messages and its content is displayed when one message is selected and content of a selected message is displayed, so that steps of manual operations are reduced, and user experience is raised.

It needs to note that, when one message having the highest priority is selected from all of received messages and content of a selected message is displayed, one message having the highest priority can be selected according to a preset priority level of a message sender (for example, priority level of the terminal system>priority level of terminal users already stored in terminal contacts of the terminal>priority level of other unfamiliar terminal users), and content of a selected message is displayed. Of course, one message can also be selected in other manners and content of a selected message is displayed, to which the embodiment of the present disclosure does not limit.

For example, assuming that three messages are displayed on the lock screen interface, and a message sender of a first message is a terminal system (that is, the first message is a system message), a message sender of a second message is a certain terminal user already stored in terminal contacts of the terminal, and a message sender of a third message is other unfamiliar terminal users, then a message whose message sender is the terminal system can be selected from the three messages displayed on the lock screen interface and its content is displayed.

Further, after the content of the selected message is displayed in step 102, the method can further comprise:

turning off a message displayed currently if a message turn-off instruction is received or a set display period is reached.

Herein, the message turn-off instruction comprises at least one or more of following instructions: gesture instruction, voice instruction, slide instruction (i.e., touch instruction) or key instruction (for example, a key instruction with respect to Home key or other entity keys). Of course, it may also comprise other instructions used for turning off a message, to which the embodiment of the present disclosure does not limit.

Further, after the content of the selected message is displayed in step 102, the method can further comprise:

marking a selected message as a read state, in order to know in time which messages are read messages and which messages are unread messages.

Further, after the message currently displayed is turned off, the method can further comprise:

determining whether there are messages not read currently; and selecting one message from the messages not read and displaying content of a selected message if there are messages not read currently, so that the message display method as described in the embodiment of the present disclosure becomes more intelligent, steps of manual operations are reduced, and user experience is raised.

Optionally, it can be determined whether there are still messages not read currently by determined whether there are messages that are not marked as read state currently, to which no further description is given in the embodiment of the present disclosure.

Flows of displaying messages when at least two messages are received will be described below in detail by taking a specific embodiment as an example.

For example, assuming that there are three messages displayed on the lock screen interface, and the receiving time of the first message is 08:10, the receiving time of the second message is 08:12, and the receiving time of the third message is 08:15, then flows of displaying these three messages can be as follows:

Step S1: unlocking the lock screen interface after authentication of the unlock information is passed, and selecting one message received at the earliest time and displaying content of the message.

For example, the message whose receiving time is 08:10 can be selected and its content is displayed.

Step S2: marking the selected message as a read state.

For example, the message whose receiving time is 08:10 can be marked as the read state.

Step S3: receiving a message turn-off instruction, and turning off a message displayed currently according to the message turn-off instruction.

Step S4: determining whether there are still messages not read currently.

For example, it is determined that the messages not read currently include the message whose receiving time is 08:12 and the message whose receiving time is 08:15.

Step S5: selecting one message received at the earliest time from the messages not read and displaying content of a selected message.

For example, the message whose receiving time is 08:12 can be selected and its content is displayed.

After that, steps S2-S5 are repeated until it is determined that the number of the messages not read currently is zero.

Further, in order to raise security of messages, before authentication of the unlock message is passed, the method can further comprise:

displaying only non-private information (various information of specific message content of non-private messages) on the lock screen interface such as sender of the message if it is determined that a received message is a preset private message.

Optionally, the private message can be set in advance according to the user's requirement, for example, band account information sent from a bank, or short messages sent from close friends and so on, to which no further description is given in the embodiment of the present disclosure.

Figure 2A:
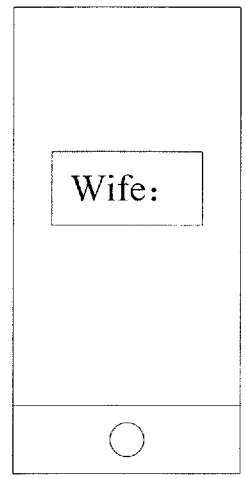
FIG. 2a shows a schematic diagram of one message display in a specific embodiment as described in the first embodiment of the present disclosure.
Figure 2B:
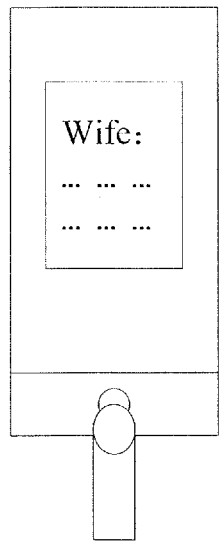
FIG. 2b shows a schematic diagram of another message display in a specific embodiment as described in the first embodiment of the present disclosure.

For example, short messages whose sender name is "wife" can be preset as private messages. Correspondingly, as shown in FIG. 2*a*, it is a schematic diagram of messages displayed on the lock screen interface before authentication of the unlock information is passed, wherein the short message sent from "wife" displays only the name of the sender. Further, as shown in FIG. 2*b*, after authentication of the unlock information (such as fingerprint unlock information) is passed and the lock screen interface is unlocked, content of the short messages sent from "wife" can be displayed directly, in order for the user to read, so that private content of the short message is protected, and security of user information is raised.

A message display method provided in the first embodiment of the present disclosure receives the unlock information and authenticates the unlock information, and selects one message from at least one received messages and displays content of a selected message if authentication of the unlock information is passed. That is, in the technical solution as described in the embodiments of the present disclosure, if it is determined that authentication of the unlock information is passed, then one message would be selected directly and its content is displayed, so that flows of displaying the message are simplified and steps of manual operation are reduced, which enables that the message display method as described in the embodiment of the present disclosure become more user-friendly and user experience would be better.

Second Embodiment

Figure 3:
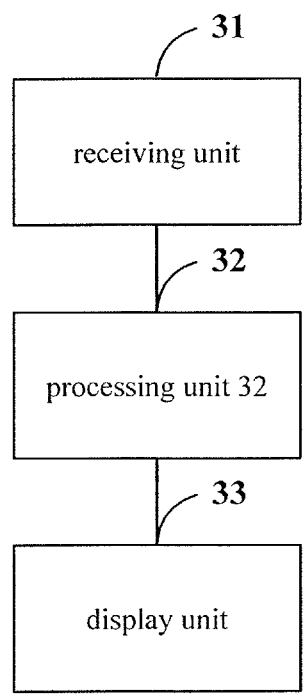
FIG. 3 is a schematic diagram of a structure of a message display apparatus as described in a second embodiment of the present disclosure.

Based on an inventive concept same as the first embodiment of the present disclosure, there is provided in the second embodiment of the present disclosure a message display apparatus. Specific implementation of the message display apparatus can refer to relevant description in the above first method embodiment, and thus repeated description is not given. The schematic diagram of its structure is as shown in FIG. 3. The apparatus can mainly comprise:

A receiving unit 31 is configured to receive unlock information and authenticate the unlock information;

Optionally, the unlock information can comprise at least one or more of following information: fingerprint unlock information, key unlock information, slide unlock information (i.e., touch unlock information), gesture unlock information, voice unlock information or human face recognition unlock information or the like. Of course, it may also comprise other unlock information used for unlocking a lock screen interface, to which the embodiment of the present disclosure does not limit.

A processing unit 32 is configured to select one message from at least one received messages and display content of a selected message if it is determined that authentication of the unlock information is passed.

Herein, the message can comprise short message notifications or messages pushed out by various applications, to which the embodiment of the present disclosure does not limit.

Further, authenticating the unlock information by the receiving unit 31 can be implemented as: determining whether the unlock information matches with authorized unlock information that is stored locally in advance; if the unlock information matches with the authorized unlock information, then it is considered that authentication of the unlock information is passed; otherwise, a user is refused to access.

Correspondingly, the message display apparatus as described in the embodiment of the present disclosure can further comprise a storage unit configured to store authorized unlock information, such as fingerprint unlock information or human face recognition unlock information and so on, to which no further description is given in the embodiment of the present disclosure.

Further, when at least two messages are received, the processing unit 32 can be configured to select one message received at the earliest time or one message having a highest priority from all of received messages and display content of the selected message.

Further, the receiving unit 31 can be further configured to turn off a message displayed currently if a message turn-off instruction is received or a set display period is reached after the processing unit 32 displays the content of the selected message Herein, the message turn-off instruction comprises at least one or more of following instructions: gesture instruction, voice instruction, slide instruction (i.e., touch instruction) or key instruction (for example, a key instruction with respect to Home key or other entity keys). Of course, it may also comprise other instructions used for turning off a message, to which the embodiment of the present disclosure does not limit.

Further, the processing unit 32 can be further configured to mark the selected message as a read state after the content of the selected message is displayed, in order to known in time which messages are read messages and which messages are unread messages.

Further, the processing unit 32 can be further configured to determine whether there are messages not read currently after the message currently displayed is turned off, and select one message from the messages not read and display content of a selected message if there are messages not read currently, so that the message display method as described in the embodiment of the present disclosure would be more intelligent.

Optionally, it can be determined whether there are still messages not read currently by determining whether there are still messages that are not marked as the read state currently, to which no further description is given in the embodiment of the present disclosure.

Further, the apparatus further comprises a display unit 33:

the display unit 33 can be configured to display only non-private information of a received message on a lock screen interface if it is determined that the received message is a preset private message before authentication of the unlock information is passed.

Optionally, the private message can be set in advance according to the user's requirement, for example, band account information sent from a bank, or short message sent from close friends and so on, to which no further description is given in the embodiment of the present disclosure.

The message display apparatus provided in the second embodiment of the present disclosure receives the unlock information and authenticates the unlock information, and selects one message from at least one received messages and displays content of a selected message if authentication of the unlock information is passed. That is, in the technical solution as described in the embodiment of the present disclosure, if it is determined that authentication of the unlock information is passed, then one message would be selected directly and its content is displayed, so that flows of displaying the message are simplified and steps of manual operation are reduced, which enables that the message display method of the embodiment of the present disclosure become more user-friendly and user experience would be better.

Those skilled in the art shall understand that the embodiments of the present disclosure can be provided as a method, an apparatus (device) or a computer program product. Therefore, the present disclosure can adopt forms of a full hardware embodiment, a full software embodiment, or an embodiment of combining software and hardware. Furthermore, the present disclosure can adopt a form of a computer program product implemented on one or more computer-readable storage media (including but not limited to magnetic disc memory, CD-ROM, and optional memory and so on) containing a computer-readable program code.

The present disclosure is described by referring to flowcharts and/or block diagrams of the method, apparatus (device), and computer program product according to the embodiments of the present disclosure. It shall be understood that each flow and/or block of flowcharts and/or block diagrams and a combination of flows and/or blocks of flowcharts and/or block diagrams can be implemented by computer program instructions. There computer program instructions can be provided to a general computer, a specific computer, an embedded processor or processors of other programmable data processing devices to generate a machine, so that an instruction executed by a computer or a processor of other programmable data processing device generates an apparatus configured to implement the functions specified in one flow or a plurality of flows of flowcharts and/or one block or a plurality of blocks of block diagrams.

These computer program instructions can also be stored in a computer readable memory being capable of booting a computer or other programmable data processing devices to operate in a particular way, so that the instruction stored in the computer readable memory comprises a manufacturer including an instruction apparatus. This instruction apparatus implements functions specific in one flow or a plurality of flows of flowcharts and/or one block or a plurality of blocks of block diagrams.

These computer program instructions can be loaded to a computer or other programmable data processing devices, so that a series of operation steps are executed on the computer or other programmable devices to generate processing implemented by the computer. Thus, the instructions executed on the computer or other programmable devices provide steps used for realizing the functions specific in one flow and/or a plurality of flows of flowcharts and/or block or a plurality of blocks of block diagrams.

Although preferable embodiments of the present disclosure are described, those skilled in the art can make additional alterations and amendments to these embodiments once they know basic inventive concepts. Therefore, the claims intend to be explained as including the preferable embodiments and all the alternations and amendments falling into the scope of the present disclosure.

Obviously, those skilled in the art can make various alternations and modifications to the present disclosure without departing from the spirit and scope thereof. As such, if these amendments and modifications of the present disclosure belong to the scope of the claims and their equivalent technology, then the present disclosure intends to include these alternations and modifications.

The present application claims the priority of a Chinese patent application No. 201510437362.1 filed on Jul. 23, 2015. Herein, the content disclosed by the Chinese patent application is incorporated in full by reference as a part of the present disclosure.

What is claimed is:

1. A message processing method for a terminal, comprising:
   receiving at least one message;
   receiving unlock information and authenticating the unlock information; and
   in response to a determination that authentication of the unlock information is passed, selecting one message from the at least one received message and displaying content of a selected message, wherein when at least two messages are received, the selecting one message and displaying content of a selected message comprises:
   selecting one message received at the earliest time or one message having a highest priority according to a preset priority level of a message sender from all of received messages, and displaying content of a selected message,
   wherein after the content of the selected message is displayed, the method further comprises: turning off a message displayed currently if a message turn-off instruction is received or a set display period is reached, and
   wherein after the message displayed currently is turned off, the method further comprises: determining whether there are messages not read currently; and selecting one message from the messages not read and displaying content of a selected message if there are messages not read currently.

2. The method according to claim 1, wherein the unlock information comprises at least one or more of following information:
   fingerprint unlock information, key unlock information, slide unlock information, gesture unlock information, voice unlock information or human face recognition unlock information.

3. The method according to claim 1, wherein the message turn-off instruction comprises at least one or more of following instructions:
   gesture instruction, voice instruction, slide instruction or key instruction.

4. The method according to claim 1, wherein after the content of the selected message is displayed, the method further comprises:
   marking the selected message as a read state.

5. The method according to claim 1, wherein before authentication of the unlock information is passed, the method further comprises:
   displaying only non-private information of a received message on a lock screen interface if it is determined that the received message is a preset private message.

6. A non-transitory computer readable medium storing a program causing a processor to execute a process, the process comprising:
   receiving at least one message;
   receiving unlock information and authenticate the unlock information; and
   in response to a determination that authentication of the unlock information is passed, selecting one message from the at least one received message and display content of a selected message,
   wherein the process further comprises:
   selecting one message received at the earliest time or one message having a highest priority according to a preset priority level of a message sender from all of received messages and display content of a selected message when at least two messages are received,
   marking the selected message as a read state after the content of the selected message is displayed, and
   determining whether there are messages not read currently after the message displayed currently is turned off, and select one message from the messages not read and display content of a selected message if there are messages not read currently.

7. The non-transitory computer readable medium according to claim 6, wherein the unlock information comprises at least one or more of following information:
   fingerprint unlock information, key unlock information, slide unlock information, gesture unlock information, voice unlock information or human face recognition unlock information.

8. The non-transitory computer readable medium according to claim 6, wherein the process further comprises turning off a message currently displayed if a message turn-off instruction is received or a set display period is reached after the processing displays the content of the selected message.

9. The non-transitory computer readable medium according to claim 8, wherein the message turn-off instruction comprises at least one or more of following instructions:
   gesture instruction, voice instruction, slide instruction or key instruction.

10. The non-transitory computer readable medium according to claim 6, wherein the process further comprises displaying only non-private information of a received message on a lock screen interface if it is determined that the received message is a preset private message before authentication of the unlock information is passed.

* * * * *